United States Patent
Moon et al.

(10) Patent No.: US 9,923,185 B2
(45) Date of Patent: Mar. 20, 2018

(54) RECHARGEABLE BATTERY

(71) Applicant: Samsung SDI Co., Ltd., Yongin-si, Gyeonggi-do (KR)

(72) Inventors: Jong-Seok Moon, Yongin-si (KR); Hui-Jun Lee, Yongin-si (KR); Kwan-Hyung Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 166 days.

(21) Appl. No.: 14/199,741

(22) Filed: Mar. 6, 2014

(65) Prior Publication Data

US 2015/0086857 A1    Mar. 26, 2015

(30) Foreign Application Priority Data

Sep. 24, 2013  (KR) .......................... 10-2013-0113342

(51) Int. Cl.
    *H01M 2/30*    (2006.01)
(52) U.S. Cl.
    CPC ............. *H01M 2/305* (2013.01); *H01M 2/30* (2013.01)
(58) Field of Classification Search
    CPC ................................................... H01M 2/305
    USPC ........................................................ 429/178
    See application file for complete search history.

(56) References Cited

U.S. PATENT DOCUMENTS

| | | | |
|---|---|---|---|
| 2011/0081572 A1 | 4/2011 | Byun et al. | |
| 2011/0143194 A1* | 6/2011 | Kim ................... | H01M 2/0443 429/178 |
| 2011/0244281 A1* | 10/2011 | Byun .................... | H01M 2/22 429/62 |
| 2011/0244310 A1* | 10/2011 | Kim .................... | H01M 2/0212 429/158 |
| 2011/0300435 A1 | 12/2011 | Byun | |
| 2012/0100420 A1 | 4/2012 | Byun et al. | |
| 2012/0148884 A1 | 6/2012 | Kim | |
| 2012/0148911 A1 | 6/2012 | Suzuki et al. | |

(Continued)

FOREIGN PATENT DOCUMENTS

| | | |
|---|---|---|
| CN | 102315415 A | 1/2012 |
| CN | 102544424 A | 7/2012 |
| CN | 102683760 A | 9/2012 |

(Continued)

OTHER PUBLICATIONS

EPO Search Report dated Feb. 13, 2015, for corresponding European Patent application 14164088.8, (5 pages).

(Continued)

*Primary Examiner* — James Lee
(74) *Attorney, Agent, or Firm* — Lewis Roca Rothgerber Christie LLP (57) ABSTRACT

A rechargeable battery includes an electrode assembly including a first electrode, a second electrode, and a separator between the first electrode and the second electrode, a case accommodating the electrode assembly, a cap plate coupled to the case, a first current collector coupled to the first electrode of the electrode assembly, and a first terminal assembly. The first terminal assembly includes a first terminal coupled to the first current collector and having a first fixed groove or a first fixed protrusion, and a second terminal having a second fixed groove coupled to the first fixed protrusion or a second fixed protrusion coupled to the first fixed groove.

10 Claims, 7 Drawing Sheets

(56) References Cited

U.S. PATENT DOCUMENTS

2012/0237802 A1* 9/2012 Byun et al. .............. 429/53
2013/0288088 A1 10/2013 Byun

FOREIGN PATENT DOCUMENTS

| EP | 2 463 934 A2 | 6/2012 |
|---|---|---|
| JP | 2000-138055 | 5/2000 |
| KR | 1997-0031008 A | 6/1997 |
| KR | 10-2011-0036490 | 4/2011 |
| KR | 10-2011-0133257 | 12/2011 |
| KR | 10-2012-0024503 A | 3/2012 |
| KR | 10-2012-0089789 A | 8/2012 |

OTHER PUBLICATIONS

Patent Abstracts of Japan, and English machine translation of Japanese Publication 2000-138055 dated May 16, 2000, listed above, (11 pages).
KIPO Office Action dated Jul. 20, 2016, for corresponding Korean Patent Application No. 10-2013-0113342 (8 pages).
KIPO Notice of Allowance dated Jan. 31, 2017, for corresponding Korean Patent Application No. 10-2013-0113342 (5 pages).
EPO Office Action dated Oct. 13, 2017, for corresponding European Patent Application No. 14164088.8 (4 pages).
SIPO Office Action, with English translation, dated Jan. 29, 2018, for corresponding Chinese Patent Application No. 201410486657.3 (13 pages).

* cited by examiner

RECHARGEABLE BATTERY

CROSS-REFERENCE TO RELATED APPLICATION

This application claims priority to and the benefit of Korean Patent Application No. 10-2013-0113342 filed in the Korean Intellectual Property Office on Sep. 24, 2013, the entire content of which is incorporated herein by reference.

BACKGROUND

1. Field

Aspects of the present invention relate generally to a rechargeable battery.

2. Description of the Related Art

A rechargeable battery has the characteristic that it may be recharged after discharge, differing from a primary battery that is incapable of being recharged. Small-capacity rechargeable batteries are used for small portable electronic devices such as mobile phones, notebook computers, camcorders, etc., while large-capacity rechargeable batteries are used as a motor-driving power source for larger devices, such as hybrid vehicles or large-capacity power storage devices.

Presently, high powered rechargeable batteries using a non-aqueous electrolyte with high energy density have been developed and formed into a large capacity rechargeable battery by coupling a plurality of rechargeable batteries in series for use in driving a motor of a device, for example, a motor of an electric vehicle requiring high electrical power. These rechargeable batteries can be cylindrical or angular in shape.

Rechargeable batteries generally include an electrode assembly installed inside a case and to/from which a current may be charged or discharged. An electrode terminal is electrically connected to the electrode assembly often via a current collector. The electrode terminal generally includes a positive terminal and a negative terminal, and is coupled and fixed to a cap plate for closing and sealing an opening of the case of the rechargeable battery. The electrode terminal used for this rechargeable battery can be one of a rivet-type electrode terminal or a bolt-type electrode terminal. To fix a rivet-type electrode terminal to the cap plate, the rivet-type electrode terminal must first be fixed to the cap plate, and then one side of the rivet-type electrode terminal contacting the cap plate must be rivet-processed and welded, making the combination process of fixing the electrode terminal complicated.

For rechargeable batteries, structures configured with different materials have been shown to have excellent properties, similar to a combination degree of structures combined through friction welding compared to laser welding. In contrast, it has been shown that combining structures formed with the same material through laser welding is more efficient than the same combination through friction welding.

When the rivet-type electrode terminal and the cap plate are formed with different materials, they are generally rivet-processed, and because friction welding is not easy to perform on a part having different materials coupled to the cap plate, it may be necessary to perform laser welding on the rivet-processed part. Therefore, in these rechargeable batteries, a structure made of the same material as the cap plate is coupled to one side of the rivet-type electrode terminal coupled to the cap plate through friction welding, and the structure is rivet-processed and then laser welded on the rivet-processed part. As a result, when the rivet-type electrode terminal and the cap plate are formed with different materials, the process for fixing the electrode terminal to the cap plate becomes complicated.

SUMMARY

Aspects of the present invention relate generally to a rechargeable battery, and more particularly to a rechargeable battery having an improved terminal configuration.

An embodiment of the present invention provides a rechargeable battery including an electrode assembly having a first electrode, a second electrode, and a separator between the first electrode and the second electrode, a case accommodating the electrode assembly, a cap plate coupled to the case, a first current collector coupled to the first electrode of the electrode assembly, and a first terminal assembly. The first terminal assembly may include a first terminal coupled to the first current collector and having a first fixed groove or a first fixed protrusion, and a second terminal having a second fixed groove coupled to the first fixed protrusion or a second fixed protrusion coupled to the first fixed groove.

In an embodiment, the first fixed groove includes a first spiral groove, and the second fixed protrusion includes a second thread configured to engage the first spiral groove.

In another embodiment, the second fixed groove includes a second spiral groove, and the first fixed protrusion includes a first thread configured to engage the second spiral groove.

The first terminal may be made of a first material, and the second terminal may be made of a second material different from the first material.

The first terminal assembly may further include a first terminal plate on the cap plate, the first current collector may be made of the first material, and the first terminal plate made be made of the second material.

In an embodiment, the first material is copper, and the second material is aluminum.

The rechargeable battery may further include a corrosion preventing member between the first terminal and the second terminal.

The corrosion preventing member may be coated on the first fixed protrusion or on the second fixed protrusion.

The rechargeable battery according to an embodiment further includes a second current collector coupled to the second electrode, and a second terminal assembly. The second terminal assembly may include a third terminal coupled to the second current collector and having a third fixed groove or a third fixed protrusion, and a fourth terminal having a fourth fixed groove coupled to the third fixed protrusion or a fourth fixed protrusion coupled to the third fixed groove.

In an embodiment, the third fixed groove includes a third spiral groove, and the fourth fixed protrusion includes a fourth thread configured to engage the third spiral groove.

In another embodiment, the fourth fixed groove includes a fourth spiral groove, and the third fixed protrusion includes a third thread configured to engage the fourth spiral groove.

According to aspects of the present invention, a rechargeable battery having a terminal that is easily assembled and is easily and stably combined with the cap plate is provided, improving productivity and durability of the rechargeable battery including the terminal that is easily assembled and is easily and stably combined with the cap plate.

DETAILED DESCRIPTION

In the following detailed description, only certain exemplary embodiments of the present invention have been shown and described, simply by way of illustration. As those skilled in the art would realize and appreciate, the described embodiments may be modified in various ways, all without departing from the spirit or scope of the present invention.

Figure 1:
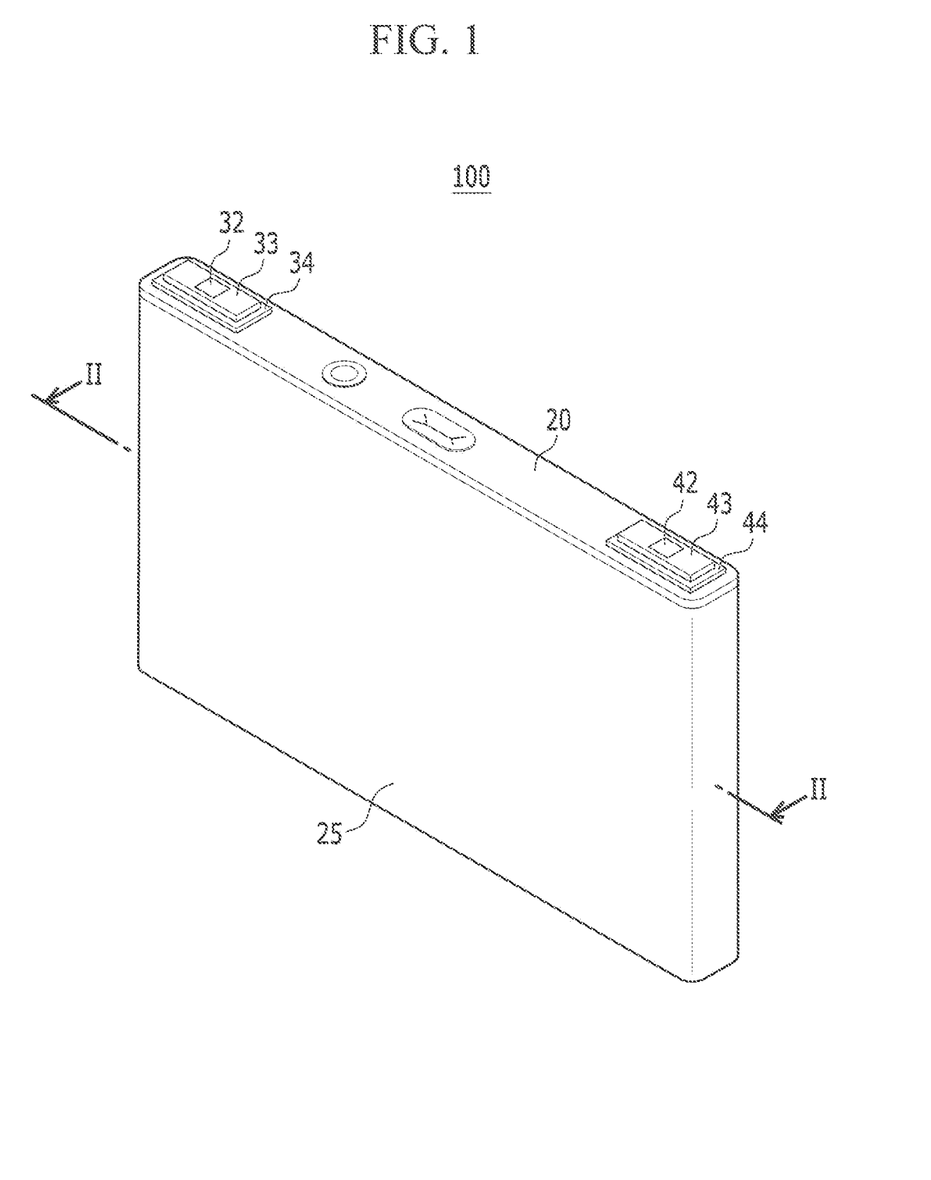
FIG. 1 shows a perspective view of a rechargeable battery according to a first embodiment of the present invention.
Figure 2:
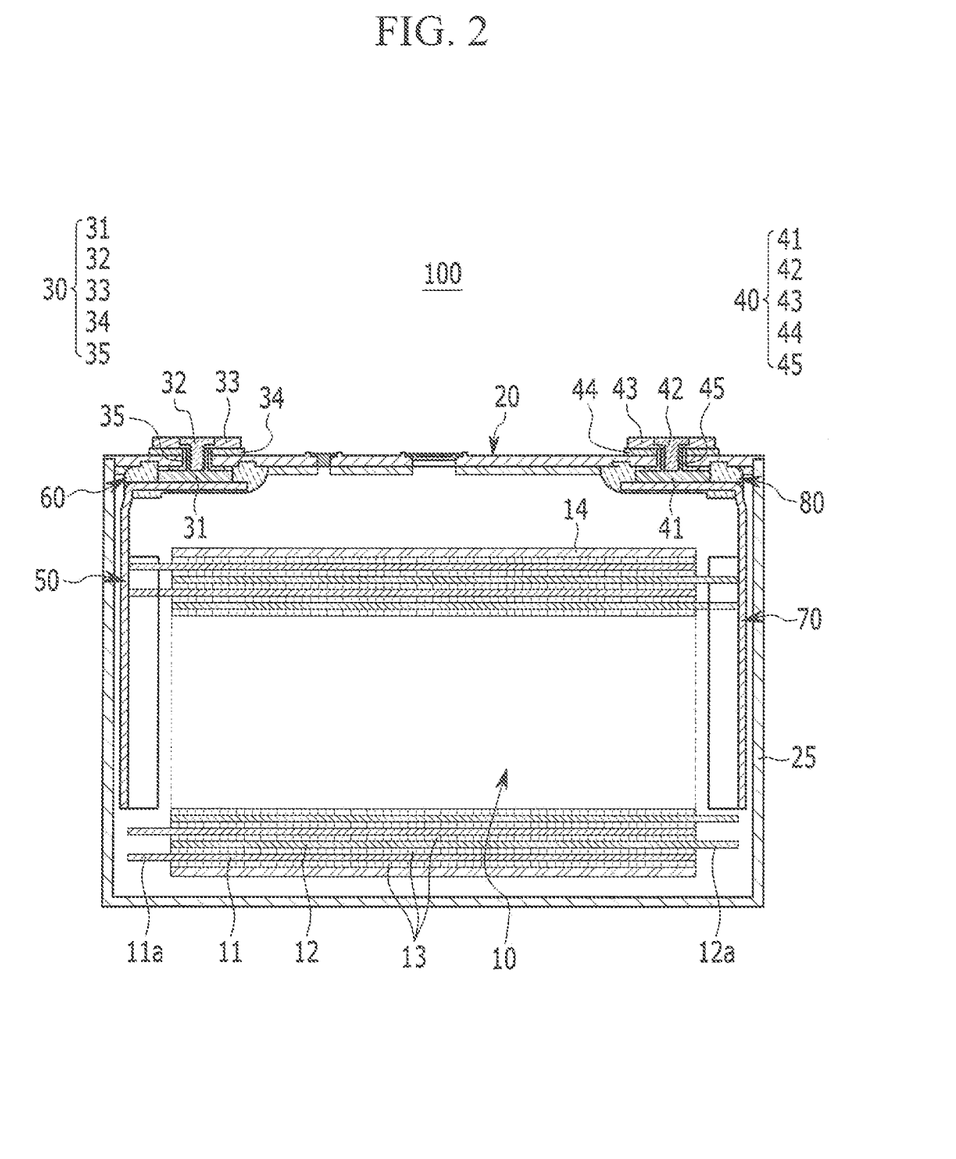
FIG. 2 shows a cross-sectional view of the rechargeable battery shown in FIG. 1 taken along line II-II.

FIG. 1 shows a perspective view of a rechargeable battery according to a first embodiment of the present invention, and FIG. 2 shows a cross-sectional view of the rechargeable battery shown in FIG. 1 taken along line II-II.

Referring to FIGS. 1 and 2, a rechargeable battery 100 includes an electrode assembly 10, a case 25 in which the electrode assembly 10 is installed, a first terminal assembly 30 and a second terminal assembly 40 electrically connected to the electrode assembly 10, a cap plate 20, and a first bottom insulating member 60 and a second bottom insulating member 80.

The rechargeable battery 100 in the first embodiment is an angular lithium ion secondary battery. However, the present invention is not restricted thereto, and embodiments of the present invention are applicable to a variety of types and shapes of rechargeable batteries, including a cylindrical or lithium polymer battery.

The electrode assembly 10 may be a jellyroll having a spirally wound first electrode 11, second electrode 12, and separator 13 assembly.

Further, in an embodiment, an insulation tape 14 is coupled to a surface of the electrode assembly 10 to insulate the electrode assembly 10 from the case 25.

In this embodiment, the first electrode 11 is a negative electrode and the second electrode 12 is a positive electrode. However, the present invention is not restricted to this embodiment, and the first electrode 11 can be a positive electrode with the second electrode 12 being a negative electrode, for example.

The first electrode 11 and the second electrode 12 according to this embodiment are each divided into a coated region having an active material coated on a current collector, and a first electrode uncoated region 11a and a second electrode uncoated region 12a, respectively on sides of the coated region of the first and second electrodes 11 and 12 without the active material coated on the current collector.

In these embodiments, the first terminal assembly 30 is electrically connected to the first electrode uncoated region 11a of the electrode assembly 10 with a first current collector 50 as a medium, and the second terminal assembly 40 is electrically connected to the second electrode uncoated region 12a with a second current collector 70 as a medium.

The first terminal assembly 30 according to these embodiments includes a first bottom terminal 31 (hereinafter, "first terminal"), a first top terminal 32 (hereinafter, "second terminal"), a first terminal plate 33, a first terminal insulating member 34, and a first gasket 35 between the first terminal 31 and the cap plate 20.

The second terminal assembly 40 according to these embodiments includes a second bottom terminal 41 (hereinafter, "third terminal"), a second top terminal 42 (hereinafter, "fourth terminal"), a second terminal plate 43, a second connecting plate 44, and a second gasket 45 between the third terminal 41 and the cap plate 20. In an embodiment, the second connecting plate 44 can be made from a conductive material such that the cap plate 20 and the case 25 can be electrically connected to the second electrode 12 through the second connecting plate 44.

Embodiments of the current invention are not restricted to the embodiments of the first terminal assembly 30 and the second terminal assembly 40 as described for the rechargeable battery 100, and in some embodiments, may include the structure of only one of the first terminal assembly 30 or the second terminal assembly 40 for the rechargeable battery 100 as described. In an embodiment, for example, one of the first terminal assembly 30 or the second terminal assembly 40 may exclude the first terminal 31, the second terminal 32, the third terminal 41, and/or the fourth terminal 42, but instead include a rivet-type terminal or a bolt-type terminal. Therefore, in other embodiments, the rechargeable battery 100 may include only one of the first terminal assembly 30 or the second terminal assembly 40, or may include both the first terminal assembly 30 and the second terminal assembly 40.

Figure 3:
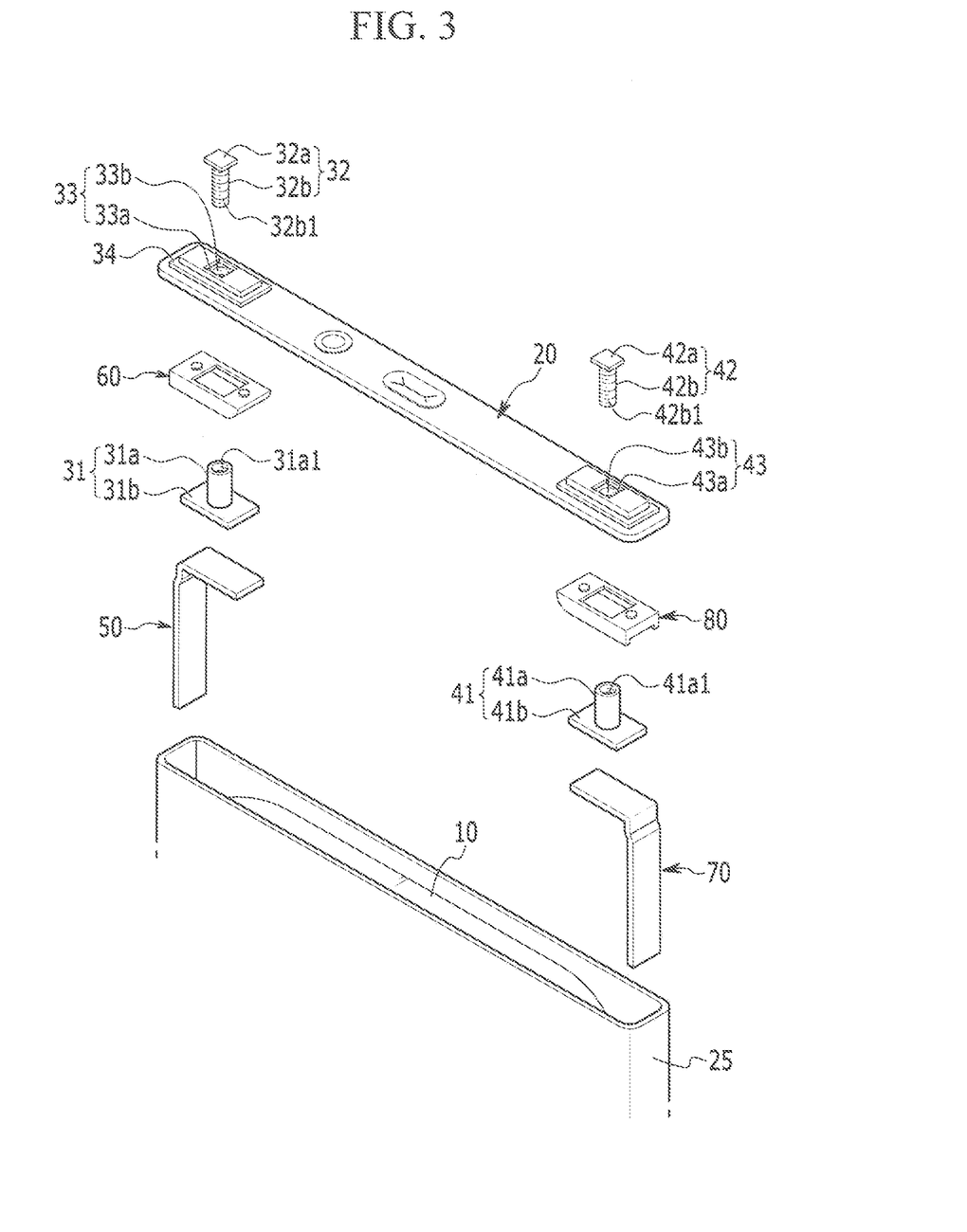
FIG. 3 shows an exploded perspective view of the rechargeable battery according to the first embodiment of the present invention.
Figure 4:
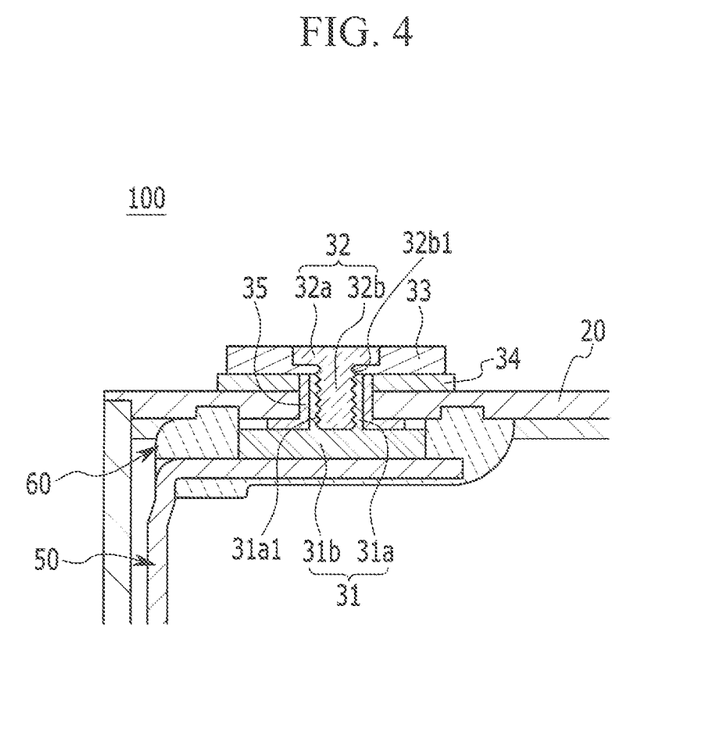
FIG. 4 shows a partial cross-sectional view of the rechargeable battery according to the first embodiment of the present invention.

FIG. 3 shows an exploded perspective view of a rechargeable battery according to the first embodiment of the present invention, and FIG. 4 shows a partial cross-sectional view of the rechargeable battery according to the first embodiment of the present invention.

Referring to the embodiments shown in FIGS. 3 and 4, the first terminal 31 of the first terminal assembly 30 includes a first terminal column 31a having a first fixed groove 31a1, and a first terminal flange 31b protruding from an end of the first terminal column 31a.

In this embodiment, the second terminal 32 of the first terminal assembly 30 includes a second terminal head 32a and a second terminal column 32b extending from the second terminal head 32a and having a second fixed protrusion 32b1.

In this embodiment, the second terminal column 32b can be inserted into the first fixed groove 31a1 in the first terminal column 31a and can be coupled or fixed thereto. In an embodiment, the first fixed groove 31a1 includes a first spiral groove, and the second fixed protrusion 32b1 includes a second thread. Thus, when the second terminal column 32b of the second terminal 32 is inserted into the first fixed groove 31a1 of the first terminal 31 according to this embodiment, a first thread of the second fixed protrusion 32b1 can be fastened to a first spiral groove of the first fixed groove 31a1, for example via a threaded connection, and can be coupled or fixed thereto.

In an embodiment, the second terminal column 32b of the second terminal 32 is passed through a second terminal hole 33a of the first terminal plate 33 and is then inserted into the first fixed groove 31a1 of the first terminal 31, and the second terminal head 32a of the second terminal 32 is fixed to a second terminal groove 33b defining an area around the second terminal hole 33a. In this embodiment, when fixed to the second terminal groove 33b, the second terminal head 32a can be coupled to the first terminal plate 33 through laser welding.

In these embodiments, by controlling a torque force or rotation of the second terminal 32, the torque or rotation of the coupled second terminal 32 and first terminal 31 can also be controlled, and thus a compression rate of the first gasket 35 positioned between the first terminal 31 and the cap plate 20 is also controlled such that the first gasket 35 can be adequately sealed.

Further, a process for coupling the first terminal assembly 30 by, for example, engaging a threaded connection between the first terminal 31 and the second terminal 32, is simplified, and a process of installing the first terminal assembly 30 on the cap plate 20 is facilitated, thereby improving productivity of manufacturing the rechargeable battery 100.

In an embodiment, the third terminal 41 of the second terminal assembly 40 includes a third terminal column 41a having a third fixed groove 41a1, and a third terminal flange 41b protruding from an end of the third terminal column 41a.

In an embodiment, the fourth terminal 42 of the second terminal assembly 40 includes a fourth terminal head 42a and a fourth terminal column 42b extending from the fourth terminal head 42a and having a fourth fixed protrusion 42b1. In this embodiment, the fourth terminal column 42b can be inserted into the third fixed groove 41a1 in the third terminal column 41a and can be coupled or fixed thereto. In an embodiment, the third fixed groove 41a1 includes a first spiral groove, and the fourth fixed protrusion 42b1 includes a second thread. Thus, when the fourth terminal column 42b of the fourth terminal 42 is inserted into the third fixed groove 41a1 of the third terminal 41 according to this embodiment, the first thread of the fourth fixed protrusion 42b1 can be fastened to the first spiral groove of the third fixed groove 41a1, for example via a threaded connection, and can be coupled or fixed thereto.

In an embodiment, the fourth terminal column 42b of the fourth terminal 42 is passed through a second terminal hole 43a in the second terminal plate 43 and is then inserted into the third fixed groove 41a1 of the third terminal 41, and the fourth terminal head 42a of the fourth terminal 42 is fixed to a fourth terminal groove 43b defining an area around the second terminal hole 43a. In this embodiment, when fixed to the fourth terminal groove 43b, the fourth terminal head 42a can be coupled to the second terminal plate 43 through laser welding.

In these embodiments, by controlling a torque force or rotation of the fourth terminal 42, a torque or rotation of the coupled fourth terminal 42 and third terminal 41 can also be controlled, and thus a compression rate of the second gasket 45 positioned between the third terminal 41 and the cap plate 20 is also controlled such that the second gasket 45 can be adequately sealed.

Further, a process for coupling the second terminal assembly 40 by, for example, engaging a threaded connection between the third terminal 41 and the fourth terminal 42, is simplified, and a process of installing the second terminal assembly 40 on the cap plate 20 is facilitated, thereby improving productivity of manufacturing the rechargeable battery 100.

As would be appreciated by those skilled in the art, the first terminal through the fourth terminal (31, 32, 41, and 42) of the first terminal assembly 30 and the second terminal assembly 40 can have other configurations that are different from those embodiments described above.

A configuration of first and second terminal assemblies according to another embodiment of the present invention is described in detail.

Figure 5:
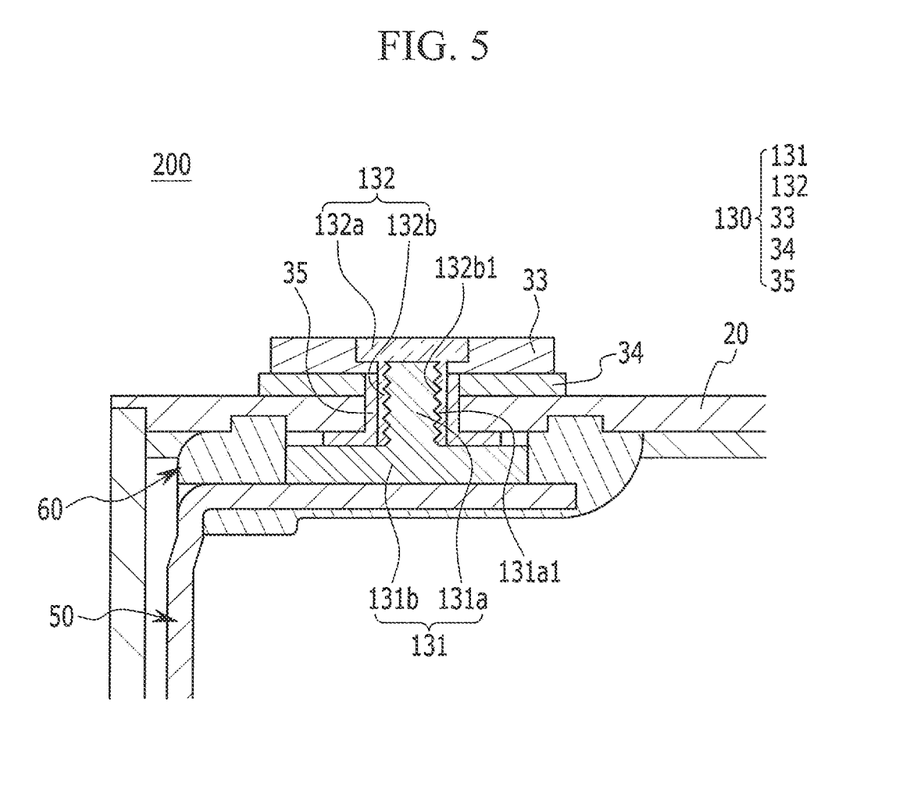
FIG. 5 shows a partial cross-sectional view of a rechargeable battery according to a second embodiment of the present invention.

FIG. 5 shows a partial cross-sectional view of a rechargeable battery according to a second embodiment of the present invention.

The rechargeable battery 200 according this embodiment has the same configuration as the first terminal assembly 30 according to the first embodiment, except for a first bottom terminal 131 (hereinafter, "first terminal") and a first top terminal 132 (hereinafter, "second terminal") of the first terminal assembly 130 of the rechargeable battery 200 according to the second embodiment. Therefore, no detailed description on the same configurations of the first terminal assembly 30 according to the first embodiment of the present invention will be provided.

In this embodiment, the first terminal 131 of the first terminal assembly 130 includes a first terminal column 131a having a first fixed protrusion 131a1, and a first terminal flange 131b protruding from an end of the first terminal column 131a.

The second terminal 132 of the first terminal assembly 130 includes a second terminal head 132a and a second terminal column 132b extending from the second terminal head 132a and having a second fixed groove 132b1.

In this embodiment, the first terminal column 131a can be inserted into the second fixed groove 132b1 in the second terminal column 132b, and can then be coupled or fixed thereto. In an embodiment, the second fixed groove 132b1 includes a first spiral groove, and the first fixed protrusion 131a1 includes a second thread. Thus, when the first terminal column 131a of the first terminal 131 is inserted into the second fixed groove 132b1 of the second terminal 132 according to this embodiment, the first thread of the first fixed protrusion 131a1 can be fastened to the first spiral groove of the second fixed groove 132b1, for example via a threaded connection, and can be coupled or fixed thereto.

In these embodiments, by controlling a torque force or rotation of the first terminal 131, the torque or rotation of the coupled first terminal 131 and second terminal 132 can be controlled, and thus a compression rate of the first gasket 35 positioned between the first terminal 131 and the cap plate 20 is also controlled such that the first gasket 35 can be adequately sealed.

Further, a process for coupling the first terminal assembly 130 by, for example, engaging a threaded connection between the first terminal 131 and the second terminal 132, is simplified, and a process of installing the first terminal assembly 130 on the cap plate 20 is facilitated, thereby improving productivity of manufacturing the rechargeable battery 200.

In this embodiment, the rechargeable battery 200 may also include a second terminal assembly 40 electrically connected to the second electrode 12 and having the same configuration as the first terminal assembly 130 according to the present embodiment of the present invention or the first terminal assembly 30 according to the first embodiment.

Figure 6:
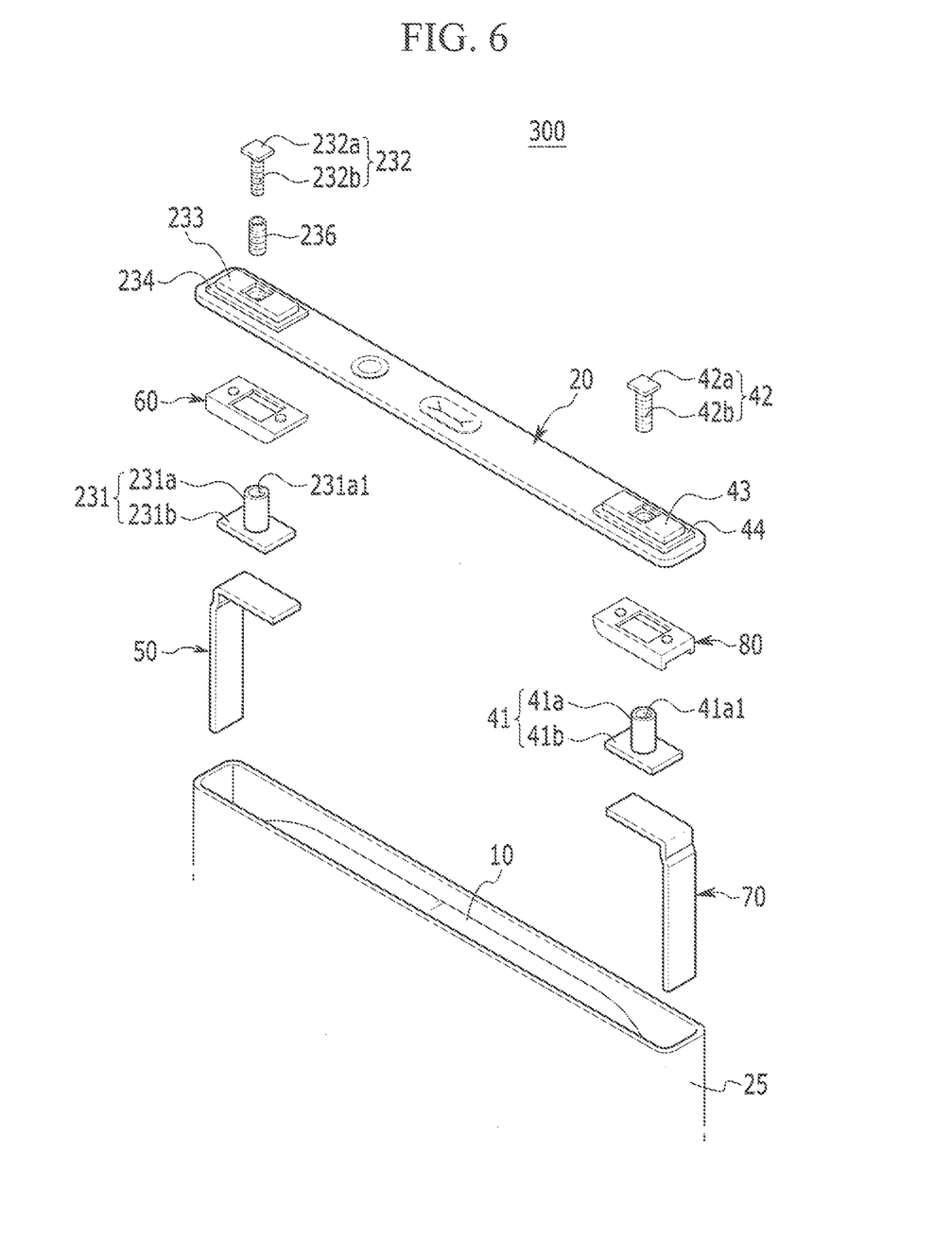
FIG. 6 shows an exploded perspective view of a rechargeable battery according to a third embodiment of the present invention.
Figure 7:
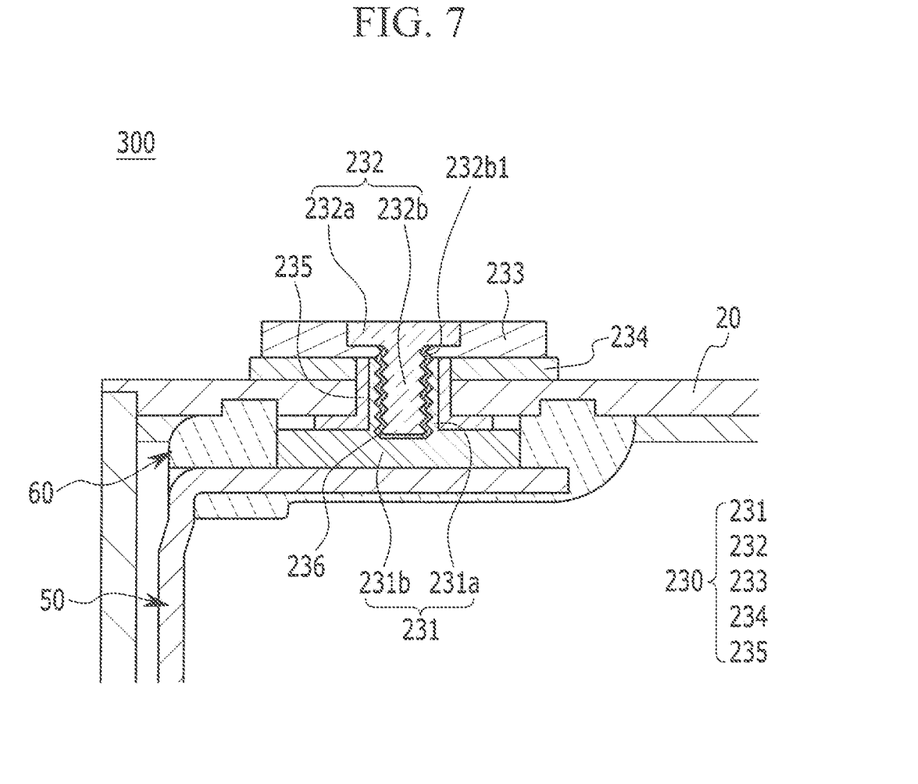
FIG. 7 shows a partial cross-sectional view of the rechargeable battery according to the third embodiment of the present invention.

FIG. 6 shows an exploded perspective view of a rechargeable battery according to a third embodiment of the present invention, and FIG. 7 shows a partial cross-sectional view of the rechargeable battery according to the third embodiment of the present invention.

Referring to the embodiments shown in FIGS. 6 and 7, the rechargeable battery 300 according to these embodiments has the same configuration as the rechargeable battery 100 according to the first embodiment, except a first terminal assembly 230. Therefore, no detailed description of the same configurations as in the rechargeable battery 100 according to the first embodiment will be provided.

The first terminal assembly 230 according to these embodiments includes a first bottom terminal 231 (hereinafter, "first terminal"), a first top terminal 232 (hereinafter, "second terminal"), a first terminal plate 233, a first terminal insulating member 234, a first gasket 235 between the first terminal 231 and the cap plate 20, and a corrosion preventing member 236. The first terminal assembly 230 according to these embodiments has the same configuration as the first terminal assembly 30 according to the first embodiment, except for the corrosion preventing member 236. Therefore, no detailed description of the same configurations of the first terminal assembly 30 according to the first embodiment will be provided.

Further, the first terminal 231 and the second terminal 232 according to these embodiments have the same configurations the first terminal 31 and the second terminal 32 according to the first embodiment, except that the first terminal 231 and the second terminal 232 may be made of different materials, for example different types of metal. Therefore, no detailed description on the same configuration of the first terminal 31 and the second terminal 32 according to the first embodiment will be provided.

The first terminal 231 and the first current collector 50 according to these embodiments may made from the same material, for example the same type of metal, and the second terminal 232 and the first terminal plate 233 may be made from the same material, for example the same type of metal. For example, the first terminal 231 and the first current collector 50 according an embodiment can be made of copper, and the second terminal 232 and first terminal plate 233 can be made of aluminum.

The first terminal 231 of the first terminal assembly 230 according to an embodiment includes a first terminal column 231a having a first fixed groove 231a1, and a first terminal flange 231b protruding from an end of the first terminal column 231a.

The second terminal 232 of the first terminal assembly 230 according to this embodiment extends from a second terminal head 232a and includes a second terminal column 232b having a second fixed protrusion 232b1.

The corrosion preventing member 236 according to an embodiment, is made of an insulation material, and is positioned between the first fixed groove 231a1 of the first terminal 231 and the second fixed protrusion 232b1 of the second terminal column 232b. When the corrosion preventing member 236 is inserted into the first fixed groove 231a1 according to this embodiment, the second terminal column 232b can be coupled to the corrosion preventing member 236 and can be fixed thereto. Therefore, the corrosion preventing member 236 according to this embodiment is installed between the first fixed groove 231a1 and the second fixed protrusion 232b1 preventing generation of corrosion at a location where the first terminal 231 and the second terminal 232, which may be made of different types of material, contact each other.

Further, by controlling a torque force or rotation of the second terminal 232 according to the present embodiment, a torque or rotation of the coupled second terminal 232 and first terminal 231 can be controlled, and thus a compression rate of the first gasket 235 positioned between the first terminal 231 and the cap plate 20 is also controlled such that the first gasket 235 can be adequately sealed.

Further, in the embodiments where the first terminal 231 and the second terminal 232 that are made of different types of metal are coupled using a connection such as a threaded connection rather than a friction weld, for example, coupling the first terminal assembly 230 is facilitated, and productivity of manufacturing the rechargeable battery 300 is improved.

Further, in embodiments where the second terminal 232 and the first terminal plate 233 of the first terminal assembly 230 are made from the same material, the second terminal 232 may be fixed to the first terminal 231 and the second terminal head 232a of the second terminal 232 may be coupled to the first terminal plate 233 through laser welding thereby fixing the first terminal assembly 230 to the cap plate 20 in a stable manner.

In addition, the first terminal 231 and the second terminal 232 of the first terminal assembly 230 of the present invention can have other configurations as well as those embodiments described above. For example, according to another variation of the present exemplary embodiment, the first terminal assembly may include a first terminal including a first terminal column having a first fixed protrusion, and a second terminal including a second terminal column having a second fixed groove to which the first fixed protrusion of the first terminal and the corrosion preventing member are coupled.

In addition, the second terminal assembly according to the present embodiment is not restricted to having the same configuration as the first terminal assembly 30 according to the first embodiment, and it can have the same configuration as the first terminal assembly 130 according to the second embodiment.

While this invention has been described in connection with several embodiments described above, it is to be understood that the invention is not limited to these disclosed embodiments, but is intended to cover various modifications and equivalent arrangements included within the spirit and scope of the invention as a whole.

What is claimed is:

1. A rechargeable battery comprising:
   an electrode assembly comprising a first electrode, a second electrode, and a separator between the first electrode and the second electrode;
   a case accommodating the electrode assembly;
   a cap plate coupled to the case;
   a first current collector coupled to the first electrode of the electrode assembly;
   a first terminal assembly comprising a first terminal coupled to the first current collector and having a first fixed groove or a first fixed protrusion, and a second terminal having a second fixed groove coupled to the first fixed protrusion or a second fixed protrusion coupled to the first fixed groove, wherein, of the first and second terminals, the first terminal is entirely covered by a combination of the second terminal and the cap plate and only the second terminal is exposed and wherein the first terminal comprises a first material, and the second terminal comprises a second material different from the first material, and
   a first terminal plate exposed by the cap plate, wherein the first terminal plate is coupled to the second terminal, and wherein the first terminal plate and the second terminal are made from the same material.

2. The rechargeable battery of claim 1, wherein
   the first fixed groove includes a first spiral groove, and
   the second fixed protrusion includes a second thread configured to engage the first spiral groove.

3. The rechargeable battery of claim 1, wherein
   the second fixed groove includes a second spiral groove, and the first fixed protrusion includes a first thread configured to engage the second spiral groove.

4. The rechargeable battery of claim 1, wherein the first current collector comprises the first material.

5. The rechargeable battery of claim 4, wherein
the first material is copper, and
the second material is aluminum.

6. The rechargeable battery of claim 1, further comprising a corrosion preventing member between the first terminal and the second terminal.

7. The rechargeable battery of claim 6, wherein
the corrosion preventing member is coated on the first fixed protrusion or on the second fixed protrusion.

8. The rechargeable battery of claim 1, further comprising:
a second current collector coupled to the second electrode; and
a second terminal assembly comprising a third terminal combined to the second current collector and having a third fixed groove or a third fixed protrusion, and a fourth terminal having a fourth fixed groove coupled to the third fixed protrusion or a fourth fixed protrusion coupled to the third fixed groove.

9. The rechargeable battery of claim 8, wherein
the third fixed groove includes a third spiral groove, and
the fourth fixed protrusion includes a fourth thread configured to engage the third spiral groove.

10. The rechargeable battery of claim 8, wherein
the fourth fixed groove includes a fourth spiral groove, and
the third fixed protrusion includes a third thread configured to engage the fourth spiral groove.

* * * * *